United States Patent [19]

Ford et al.

[11] Patent Number: 4,816,160
[45] Date of Patent: Mar. 28, 1989

[54] COOLING HOLLOW FIBRE CROSS-FLOW SEPARATORS

[75] Inventors: Douglas L. Ford, Eastwood; Eric W. Anderson, Dundas; Clinton V. Kopp, Castle Hill, all of Australia

[73] Assignee: Memtec Limited, New South Wales, Australia

[21] Appl. No.: 945,870

[22] PCT Filed: Mar. 27, 1986

[86] PCT No.: PCT/AU86/00080
§ 371 Date: Nov. 17, 1986
§ 102(e) Date: Nov. 17, 1986

[87] PCT Pub. No.: WO86/05705
PCT Pub. Date: Oct. 9, 1986

[30] Foreign Application Priority Data

Mar. 28, 1985 [AU] Australia ............... PG9947
Nov. 11, 1985 [AU] Australia ............... PH3357

[51] Int. Cl.$^4$ .................. B01D 13/01; B01D 29/38
[52] U.S. Cl. ............................ 210/636; 210/798; 210/257.2; 210/321.1; 210/333.01; 210/411; 210/433.2; 210/321.69
[58] Field of Search ............ 210/636, 798, 175, 198.1, 210/200, 203, 257.2, 321.1, 321.2, 321.3, 333.01, 411, 425, 427, 433.2; 134/21, 22.11

[56] References Cited

U.S. PATENT DOCUMENTS 3,912,624 10/1975 Jennings ..................... 210/23
3,992,301 11/1976 Shippey et al. ............. 210/23

FOREIGN PATENT DOCUMENTS 56-24006  3/1981 Japan .
60-32897  2/1985 Japan .
60-22906  2/1985 Japan .
60-44088  3/1985 Japan .
60-137404 7/1985 Japan .
1535832  12/1978 United Kingdom .

OTHER PUBLICATIONS

WO85/01449, 11 Apr. 1985, Ford, "Cleaning of Filters".
"Development Studies of Cross Flow Microfiltration", by Bertera et al, *The Chemical Engineer*, pp. 10, 11, 13 and 14 (Jun. 1984).

Primary Examiner—Frank Sever
Attorney, Agent, or Firm—Oblon, Fisher, Spivak, McClelland & Maier

[57] ABSTRACT

A method of treating a heated liquid suspension, which entails:
(a) applying a liquid suspension to elastic, microporous, hollow fibres within a shell or housing, and
(b) discharging solids retained on or in the fibres by applying to the fibre lumens a pressurized reverse flow of gas, and wherein the hollow fibres are cooled prior to applying the reverse flow of gas.

8 Claims, 5 Drawing Sheets

COOLING HOLLOW FIBRE CROSS-FLOW SEPARATORS

FIELD OF THE INVENTION

This invention relates to the cooling of porous hollow fibres within a cross-flow separator.

For the sake of convenience, the invention will be described in relation to the use of hollow fibres in the recovery of fine solids from suspensions. However, it is to be understood that the invention is not limited to solids concentrators as it may be readily applied to cross-flow filters and other devices utilising porous hollow fibres.

BACKGROUND ART

The problem of recovery of fine solids from suspensions is complementary to that of recovering clear liquids from suspensions.

A detailed recent discussion of cross-flow microflilltration is given by R. Bertera, H. Steven and M. Metcalfe, *The Chemical Engineer,* pp. 10–14, June, 1984.

Economically, the ability to cope with strongly fouling solids without filter aids is most pressing. This fouling problem has long been recognised and the art records some attempts to substitute gas for clarified liquid during reverse flow to avoid the recycle of clarified liquid to the feed suspension.

Transmembrane gas reverse flow is impossible in very finely pored filters such as reverse osmosis membranes and ultrafilters because the pressures needed to overcome surface tension are far beyond the strengths of normal hollow fibre membranes used for these purposes; wettable liquids may pass but not gases. Any gas bubbles passing through such a membrane indicate the presence of pin hole defects in the membrane. Hence, this invention has no application to reverse osmosis or to true ultrafilters.

This invention is concerned with microfilters which contain larger pores than those of ultrafilters and which range from 0.001 to 10 microns. Usually, the larger of the pores are so distributed that clarified liquids are free of all visible turbidity. Turbidity of the clarified liquid involves more than pore and particle size, obeying and arising from well known optical laws.

Early microfilters fouled quickly since they treated particles which were not suspended by Brownian motion nor diffusion but which penetrated into the range of similar pore size in the manner of sieve blinding.

One prior art approach to solving this problem was to operate hydrophilic microfilters in a cross-flow mode with clarified liquid transmembrane reverse flow. High crossflow velocities required feed suspension to be directed to the smaller internal filtering surface of the lumen as opposed to the larger external surface of the fibre. Thus, reverse flow pressures had to be limited to avoid fibre crushing. The smaller filtering surface reduced output and this was frequently not a useful solution to the problem.

Another prior art approach is disclosed in Japanese Patent Kokai Publication No. 53-100882 (1978) where a hollow fibre bundle in loose "candle" configuration of hydrophilic "polyvinyl alcohol (PVA)" fibres was made to writhe during long (one minute) lumenal reverse flows with air. Filter "candles" of the kind described in this Japanes specification are more akin to dead-end filters than to cross-flow shell and tube filters in that they are in the form of elongated hollow pots closed at one end.

A development of the above "candle" configuration of hydrophilic "polyvinyl alcohol (PVA) type polymer" porous hollow fibres is to be found in U.K. Pat. No. 2,120,952. The writhing of the fibre bundle was somewhat restrained by taping the fibres loosely and enclosing them in an open sleeve which avoided the tangling and fibre breakage of the earlier mentioned Japanese Kokai Publication No. 53-108882(1978) but the gas reverse flow took 5 minutes.

The prior art in respect of reverse flow cleaning of porous hollow fibres using liquid and gas is very limited and such is also the case in relation to the cooling cross-flow sueparators treating hot feed stocks to permit fast operation in the separation mode.

Cooling hot fibres by blowing air on them or by evaporating water from them involves the same thermal principles as shaking a towel soaked in water to cool it; these thermal principles are well known.

However, the problem of using these thermal principles in precise rapid ways to cool hot separating devices to exact temperatures in uniform fashion is difficult. Most attention has been to cooling the air evaporatively by passing the air through a porous packing down which water passes. In general, a temperature gradient forms in the porous material which is undesirable with hollow fibres. On the contrary, the hottest spots of the fibre have the highest vapour pressure and lose temperature fastest, thus reaching uniformity of temperature.

DISCLOSURE OF INVENTION

The present invention is particularly concerned with the provision of methods and means for the rapid cooling of porous hollow fibre bundles in cross-flow separators handling hot suspensions in order to permit reverse flow liquid and gas cleaning of the fibres. The rapid cooling of the fibres may be integrated with other operating cycles of the separator, and the methods of the invention may be applied to suspensions containing substantial amounts of volatile substances.

The high temperature operation of cross-flow concentrators greatly increases the production rate of solids. However, cycles of reverse flow are needed to clean such separators and as the bursting pressure of some fibres at such temperatures may be exceeded, cooling of the fibres is required.

Preferably, reverse flow is commenced with clarified liquid at pressures carefully adjusted to stretch the elastic pores (without bursting the hot fibres) so as to release foulants from within substantially all of the pores of the fibres followed by gas at a pressure which exceeds the capillary pressure of surface tension in some of the larger pores to expand at the surface of the fibres and to wash away concentrate cake from the fibre surfaces and from within the shell of the concentrator.

Another consideration with the high temperature opeation of cross-flow concentrators is that the temperature of the fibres must be adjusted to that the elastic pores return rapidly to their original sizes before the suspension feed is re-applied to the exterior surfaces of the fibres for the next complete cycle.

The pressures needed to effect the reverse flow are set by the fibre elasticity in the case of liquid reverse flow and by the pore sizes and the surface tension for the gas reverse flow. For use in the microfilter range of porous polymeric fibres, these pressures are much higher than the filtering or concentrating pressures.

Thus, rapid repetititve cooling of hot fibres before reverse flow is needed for highly productive equipment.

According to the present invention there is provided a method of treating a liquid suspension in which the liquid suspension is applied to elastic, microporous, hollow fibres within a shell or housing and in which solids retained on or in the fibres or otherwise within the shell are discharged by a pressurised reverse flow of clarified liquid followed by a pressurised reverse flow of gas and wherein the hollow fibres are cooled prior to the initiation of the pressurised reverse flow.

According to another aspect of the invention there is provided a method of concentrating the solids of a liquid suspension comprising the steps of:

(i) applying the liquid suspension to the outer surface of elastic, microporous, hollow fibres within a shell or housing whereby:
  (a) some of the liquid suspension passes through the walls of the fibres to be drawn off as clarified liquid from the fibre lumens,
  (b) at least some of the solids are retained on or in the fibres or otherwise within the shell with the non-retained solids being removed from the shell with the remainder of the liquid,
(ii) terminating the flow of liquid suspension and then cooling the hollow fibres, and,
(iii) discharging the retained solids from the shell by applying through the fibre lumens:
  (a) a pressurised liquid which passes through substantially all the pores whereby substantially all of the pores are stretched to wash out any retained solids followed by,
  (b) a pressurised gas which passes through the larger pores to stretch these pores to dislodge any solids retained in those pores and to wash the external walls of the fibres and the interior of the shell to remove all solids from the shell to an external collection point.

Preferably, the application of the pressurised gas is conducted so as to backwash the full length of the fibres by displacing any lumen liquid with gas at a pressure below the bubble point of the walls. The shell is then sealed with the relatively incompressible feed liquid so that gas cannot flow through the fibre walls as the pressure of the trapped gas is raised beyond the bubble point. The seal is then released to allow the trapped gas to escape substantially uniformly through the fibre walls even at the most distant point from the lumen inlet thus minimizing subsequent preferential washing of pores near the gas inlet.

The fibres may be cooled by passing gas down the lumens of the fibres or by introducing gas into the shell of the concentrator so that the gas is applied to the exterior surface of the fibres.

BRIEF DESCRIPTION OF THE DRAWINGS

In order that the invention may be more readily understood and put into practical effect, reference will now be made to the accompanying drawings in which.

DESCRIPTION OF PREFERRED EMBODIMENTS

Figure 1:
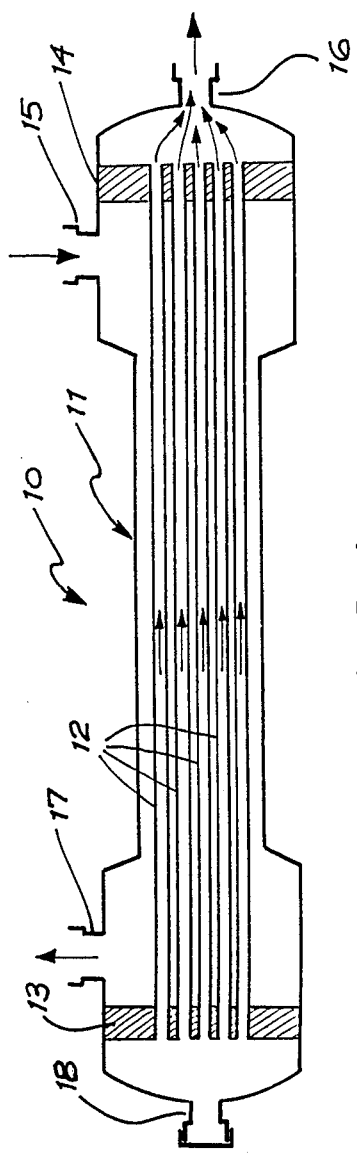
FIG. 1 is a schematic view of a hollow fibre cross-flow concentrator shown in its concentrating or operating mode.
Figure 2:
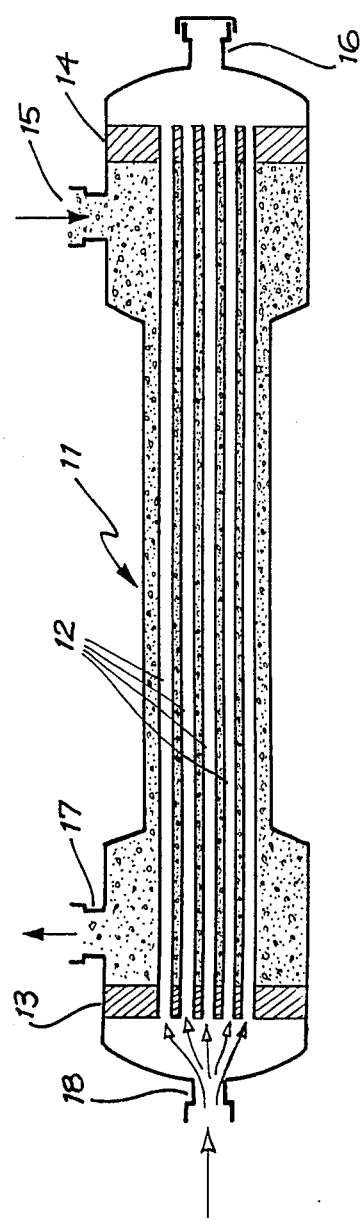
FIG. 2 is a schematic view similar to FIG. 1 with the concentrator shown in its reverse flow cleaning mode.

The hollow fibre cross-flow concentrator 10 shown in FIGS. 1 and 2 includes a cartridge shell 11 within which is positioned a bundle of hollow, porous, polymeric fibres 12. In this instance, each fibre is made of polypropylene, has an average pore size of 0.2 micron, a wall thickness of 200 micron and a lumen diameter of 200 micron. There are 3,000 hollow fibres in the bundle 12 but this number as well as the individual fibre dimensions may be varied according to operational requirements.

Polyurethane potting compound 13, 14 holds the ends of the fibres 12 in place without blocking their lumens and closes off each end of the shell 11. The liquid feed suspension to be concentrated is pumped into the shell 11 through feed suspension inlet 15 and passes over the external walls of the hollow fibres 12. Some of the feed suspension passes through the walls of the fibres 12 into the lumens of the fibres to be drawn off through the lumen outlet port 16 as clarified liquid.

The remaining feed suspension and some of the rejected species flow between the fibres 12 and leave the shell 11 through outlet 17. The remainder of the rejected species is held onto or within the fibres or is otherwise retained within the shell. In this case, lumen inlet port 18 remains closed during the operating mode of the concentrator shown in FIG. 2 although there are advantages in some high flux situations in drawing clarified liquid from both ends of the lumens.

In order to remove the species retained on or in the fibres or otherwise within the shell, outlet 16 is closed so that the flow of clarified liquid is stopped. Pressurised clarified liquid is then introduced into the lumens through lumen inlet port 18 to stretch substantially all of the pores and to wash them with at least the total pore volume of clarified liquid. Upon completion of the clarified liquid purge, compressed gas is introduced through lumen inlet port 18, along the lumens of the fibres 12 and through the walls of the fibres into the feed suspension/concentrated stream causing violent bubbling which purges the shell of any retained species which may have built up on the outer walls or may have been washed from within the pores of the fibres by the clarified liquid purge.

In one embodiment of the invention (which is particularly suitable for long thin figres), the compressed gas is introduced through inlet 18 and along the lumens of the fibres 12 after opening the lumen outlet port 16 for a limited period so that no gas penetrates the pores of the fibres at this stage. The liquid-filled shell is then sealed by closing shell inlet 15 and shell outlet 17. Gas still cannot penetrate the porous walls even though the gas pressure is now raised well above the normal bubble point of the fibre walls because the liquid within the shell is relatively incompressible. A reservoir of high pressure gas is thus accumulated in the fibre lumens.

The shell outlet 17 is then opened which allows gas to penetrate the pores along the whole length of each fibre. Initially, the surge of bubbling gas is substantially uniform, but ultimately is slower at the end remote from lumen inlet port 18 due to the viscous pressure drop along the thin fibres. In extreme case, it is desirable to admit gas through both lumen ports 16 and 18 after carrying out the above described presurised, trapped gas operation.

It is preferred that the resumption of feed suspension flow after gaseous reverse flow cleaning be delayed for sufficient time to enable the pores that have been stretched by the gas to recover to their original size so that oversized particles from the feed suspension will not be able to pass into or through the enlarged pores.

Figure 3:
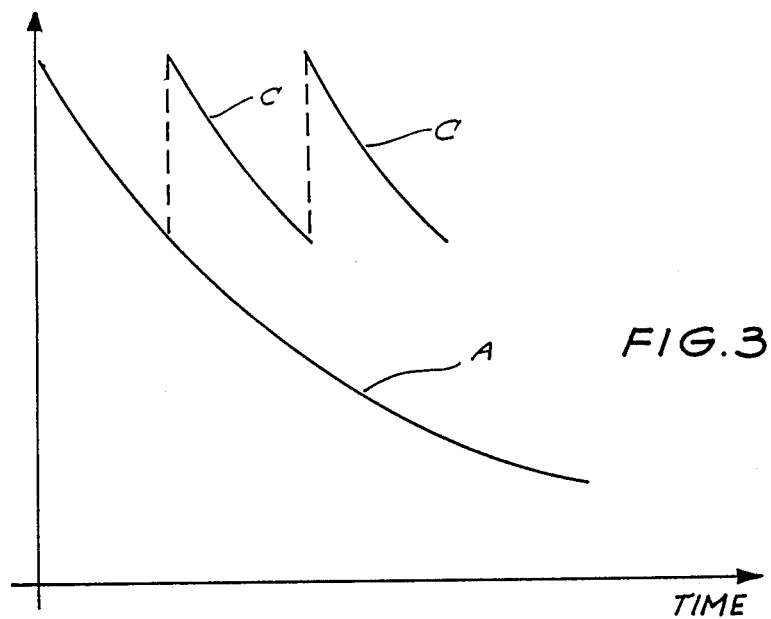
FIG. 3 is a graph of concentrator clarified liquid flux against time for a hollow fibre cross-flow concentrator.

FIG. 3 shows the effect of the solid discharges described in relation to FIG. 2 upon the rate of production of clarified liquid. Curve A shows the decay of clarified liquid flux against time without discharge of solids, wheras Curve C shows the recovrey of clarified liquid flux after each combined liquid and gaseous reverse flow discharge cycle. Although the discharge of solids returns the clarified liquid flux to almost the initial value, a decrease in efficiency may occur over an extended period of time notwithstanding successive discharges. Deposits that cannot be removed by clarified liquid followed by gaseous discharge can almost invariably be removed by chemical cleaning.

It has been noted that high output often dictates that the concentrator be operated at the highest temperature that the fibre can tolerate under the pressures needed for each phase of the total process. However, these pressures vary and the direction of pressure application to the fibre varies, imposing very different stresses at each phase and at each location on the fibre. These are the relationships to which the invention relates. As indicated earlier, the greatest stresses arise from the higher pressures used during reverse flow cleaning.

Figure 4:
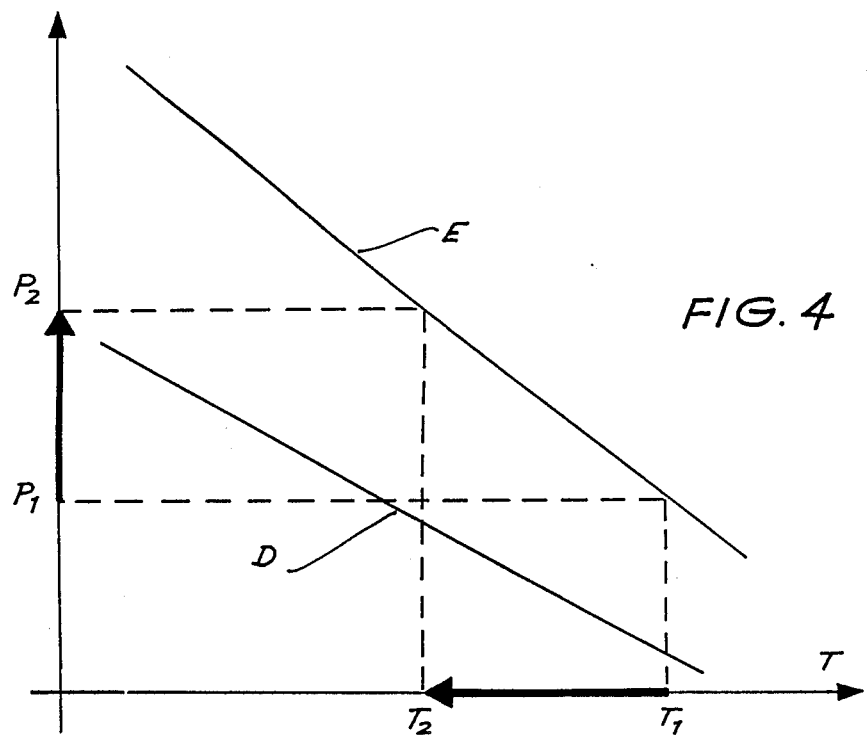
FIG. 4 is a graph of transfibre deformation pressure against temperature for a porous hollow fibre.

As is well known, the mechanical strength of polymeric hollow fibres varies substantially with temperature. In FIG. 4 Curve D represents the collapsing pressure of a polypropylene fibre in which the pressure is applied to the exterior of the fibre. The pressure at which the fibre collapses falls at higher temperatures.

Curve E in FIG. 4 shows the pressure at which a polypropylene fibre will burst when the pressure is applied to the lumen. This bursting pressure also falls at higher temperatures. If the suspension is treated at an elevated temperature $T(1)$ at which the fibre has adequate crush strength but inadequate burst strength to withstand the much higher reverse flow pressures, it is advantageous to have rapid cooling means. Then the fibres are cooled to an optimum safe temperature $T(2)$, at which the bursting pressure is substantially increased from $P(1)$ to $P(2)$ before applying the full reverse flow pressure. However, the temperature drop must be controlled so that pore-stretching is possible.

Figure 5:
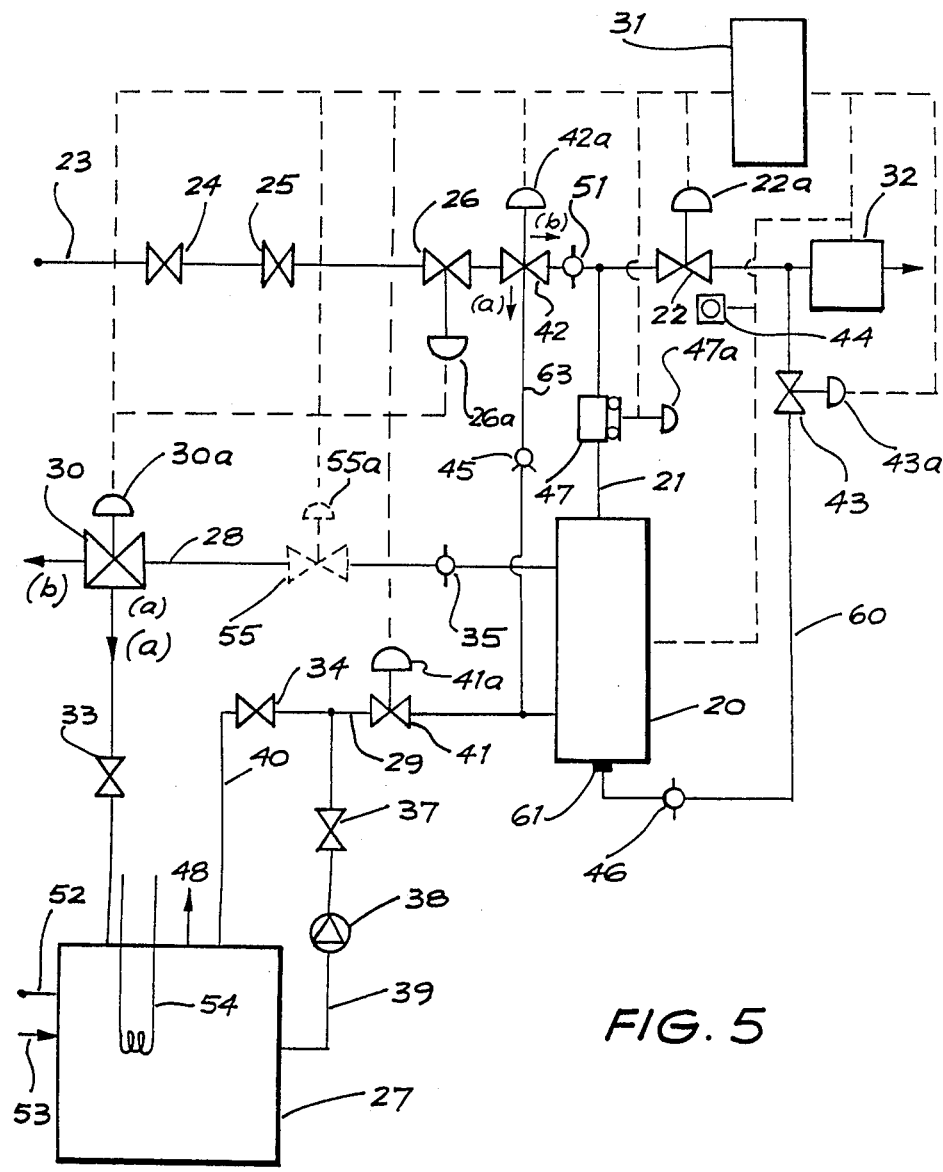
FIG. 5 is a schematic diagram of a system for treating a liquid suspension according to one embodiment of the invention.

The application of the cooling method of the invention when applied to a cross-flow hollow fibre concentrator can be implemented using the system shown in FIG. 5 which operates in a number of modes. In the cross-flow concentration mode, the pump 38 draws feed suspension from the feed suspension tank 27 through pump suction line 39 thence through inlet pressure valve 37 and delivers it through feed suspension inlet line 29 (having a feed suspension stop solenoid valve 41) to the cross-flow concentrator 20.

Feed suspension passes over the surface of the hollow fibres inside the cross-flow concentrator 20 and some of the fluid passes through the fibres into the lumens to be delivered to the clarified liquid outlet line 21. The clarified liquid in line 21 pases through clarified liquid hold-up cylinder 47 which is operated by solenoid 47a, clarified liquid control valve 22 controlled by solenoid 22a and flow sensor 32 to a clarified liquid collection point. Flow of clarified liquid to line 23 is prevented by check valve 51.

Concentrated feed suspension from the cross-flow concentrator 20 passes through the check valve 35 and the solenoid-operated shell sealing valve 55 (when fitted) into line 28 from which it is delivered to the three way concentrate divert valve 30 controlled by solenoid 30a. The valve 30 has outlet paths (a) and (b) which lead to the feed suspension tank 27 and to a concentrate collection point respectively. In the concentration mode, the valve 30 is in position (a) so that the concentrated feed suspension passes through back pressure valve 33 into the tank 27.

A bypass valve 34 in bypass line 40 is set to control, together with the inlet pressure valve 37, the flow rate through the cross-flow concentrator 20. The feed suspension tank 27 has a feed suspension inlet 53, a washing inlet 52, heater 54 and vent 48.

The suspension inlet pressure, the concentrated suspension outlet pressure and the clarified liquid pressure are controlled or set by the said valves 37, 33 and 22 respectively. During the concentration mode valve 26 is closed valve 55 is opened and valve 30 is set to path (a)

In this embodiment of the invention, the pressure in the concentrator shell 20 is set to remove gas in the filter pores within a predetermined time upon resumption of the concentration mode after backwash by clarified liquid followed by gas.

The liquor issuing from valve 22 is monitored by flow sensor 32 and the parameter sensors are used as input to the programmable controller 31. The controller 31 compares actual flow rate of the clarified liquid with preset values of flow rate and time to initiate a discharge cycle.

In this embodiment of the invention, there are two criteria for determining the appropriate time to discharge the concentrator 20. The first criterion is the clarified liquid discharge flow rate and once it decreases to a predetermined and set rate, the controller 31 initiates a discharge cycle. The second criterion is time where the controller initiates a discharge cycle at fixed time intervals. The second criterion is more appropriate for feed suspensions where the liquor flow rate does not decline very rapidly.

Substantially dry gas is introduced to the system during the discharge mode through line 23 which includes a gas pressure control valve 24, a gas flow valve 25 and a gas stop valve 26 controlled by solenoid 26a. In order to allow evaporation (and hence cooling), the gas must be under saturated with respect to the liquid vapour at the operating temperature.

A lumenal cooling discharge line 60 connected between the lumenal air outlet 61 and the clarified liquid permeate outlet line 62 contains a lumenal cooling stop valve 43 which is controlled by solenoid 43a and a lumenal cooling check valve 46. A shell cooling line 63 connected between the feed inlet line 29 and the shell cooling divert valve 42 in line 23 has a shell cooling check valve 45. The shell cooling divert valve 42 is controlled by solenoid 42a and has inlet paths (1) and (b) the functions of which will be described below.

To effect a discharge, the programmable controller 31 sets the system to discharge mode by actuating solenoids 22a, 26a, 43a and 30a which in turn close valve 22, open valve 26, close valve 43 and change the outlet path of the three way concentrate divert valve 30 to path (b) so that the subsequent variable volume clarified liquid hold up and the gaseous discharge medium as well as the material dislodged from the fibres can be discharged from the system.

If the temperature from sensor 44 to programmable controller 31 is higher than the preset limit then the programmable controller initiates a lumenal flow through of gas for rapid evaporative cooling of the hollow fibres prior to reverse flow cleaning by actuating solenoids 22a, 43a, 41a and 26a so that valve 22 is closed, valve 43 is open, valve 41 is closed and valve 26 is open for a predetermined time, termed the lumenal cool time. The lumenal cooling gas flows through line 21 without disturbing the clarified liquid in the hold-up cylinder 47 and is discharged into the clarified liquid line through valve 43. The lumenal cool time is sufficient to reduce the temperature of the fibres to within safe limits.

Although the gas will cool a fibre which is saturated with a non-volatile liquid by withdrawing heat equal to the product of the mass and the specific heat of the gas and the temperature difference, such cooling is slow and this invention is most effective when applied to liquids of substantial volatility and latent heat of evaporation. Water is ideal because of its large latent heat of evaporation. Times of 5 to 20 seconds are normal for cooling water so that there is very little loss of productive time compared to the hours saved per day by operating at the higher temperatures and better washing is thus made possible. There is little added expense since most of the expensive equipment already exists for other purposes.

The concentrate discharge is then initiated by the programmable controller 31 which actuates solenoids 43a and 30a to close valve 43 and to change valve 30 to position (b) and then actuates the electronically controlled clarified liquid hold up cylinder 47 which empties the contents of that device under pressure from gas from valve 26 into the lumens and across the membranes in the reverse direction to normal operation so as to expand all the pores and to displace all the liquid in the pores.

After the hold-up cylinder 47 has been emptied, programmable controller 31 continues gas discharge through the larger pores to wash concentrate off fibres and shell, opening valve 26 for the discharge cycle time.

To achieve more uniform gas discharge through the larger pores along the full length of a narrow fibre it is preferred to vent the gas, after hold-up cylinder 47 has been emptied, through the lumen check valve 46 and lumenal stop valve 43 (which has been opened by programmable controller 31). The controller 31 then closes shell sealing valve 55 by actuating solenoid 55a and feed stop valve 41 by actuating solenoid 41a so that gas pressure builds up within the shell 27 to the full pressure set by the gas pressure regulator 24. Valve 55 is then opened by the controller 31 for the predetermined gas discharge time.

At the end of the discharge cycle time, programmable controller 31 returns the system to the concentration mode as described above, except that valve 22 is kept closed unitl the hold-up cylinder 47 is filled with clarified liquid.

For the processing of some suspensions it may be desirable to cool the fibres by passing the gas through the shell side of the fibres. When the temperature, theta, from sensor 44 to the programmable controller 31 is higher than the preset limit and the other conditions necessitates a reverse flow cleaning cycle, the programmable controller initiates a shell-side cooling cycle by actuating valve 41 (closed), 26 (open), and 42 (to position a) for a preset time, termed the shell-side cool time, which is sufficient to reduce the temperature of the fibres to an optimal safe level. At the completion of the shell-side cool time the program able controller initiates a reverse flow cleaning cycle by actuating valves 22 (closed), 42 (to position b) for the reverse flow cycle time. At the completion of the reverse flow cleaning cycle the programmable controller returns the system to the concentration mode as described above.

EXAMPLE 1

A 10% solution of crude cane sugar was filtered in the apparatus of FIG. 5 so that filtration terminology for the separator is appropriate. There was an average transmembrane pressure (TMP) of 75 kPa and the temperature was held at 25° C. There was no additional permeate reverse flow beyond that in the lines and lumens. Air reverse flow was at 700 kPa for 6 seconds every 30 minutes. The permeation rate after 0 hours at 25° C. was 30 L/sg. m./hour.

The temperature of the feedstock was then raised to 65° C. and the average permeation rate rose to 60 L/sg. m./hour, showing the doubling of productivity.

The temperature of the feedstock was then raised to 98° C. and the permeation rate rose at once to 80 L/sg. m./hour but no reverse flow was attempted at 98° C. since experiments showed undue fibre softening at 80° C. It was decided to hold 60° C. to 65° C. as the reverse flow optimal temperature range.

The shell cooling mode was cooled by passing air at 24 litre/minute and the fibre temperature fell from 98° C. to 60° C. in 6 seconds, due to the high latent heat of vaporisation of water. The reverse direction flow cleaning cycle then proceeded satisfactorily.

EXAMPLE 2

Example 1 was repeated but this time the wet fibre bundle of 3000 fibres at 98° C. was cooled by air passing along the lumens at 24 litre/minute displacing the permeate therein, after the shell was emptied of hot suspension. The temperature of the fibres fell to 65° C. in 9 seconds.

It will be apparent from the foregoing description that the invention provides for precisely controlled cooling which is rapid and uniform. The cooling is preferably evaporative, but, it is identical in equipment needs if the feed suspension does not contain volatile substances.

The cooling of the fibres is controlled to fit the elastic properties of the fibres so as to give optimal cleaning and rate of production to the concentrator. The cooling method of the invention can be largely performed and controlled by using existing equipment on a hot crossflow hollow fibre separator.

EXAMPLE 3

The apparatus of FIG. 5 was used to filter a city water supply through a 1 square metre 0.2 micron cartridge with an average transmembrane pressure of 100 kPa. The flux was maintained at each temperature studies by periodic air backwashing and the average flux rate recorded. The flux more than doubled as the temperature was raised from 10 degrees Celsius to 50 degrees Celsius, as expected from the drop in viscosity. The value of being able to operate at the highest possible temperature is evident.

Figure 6:
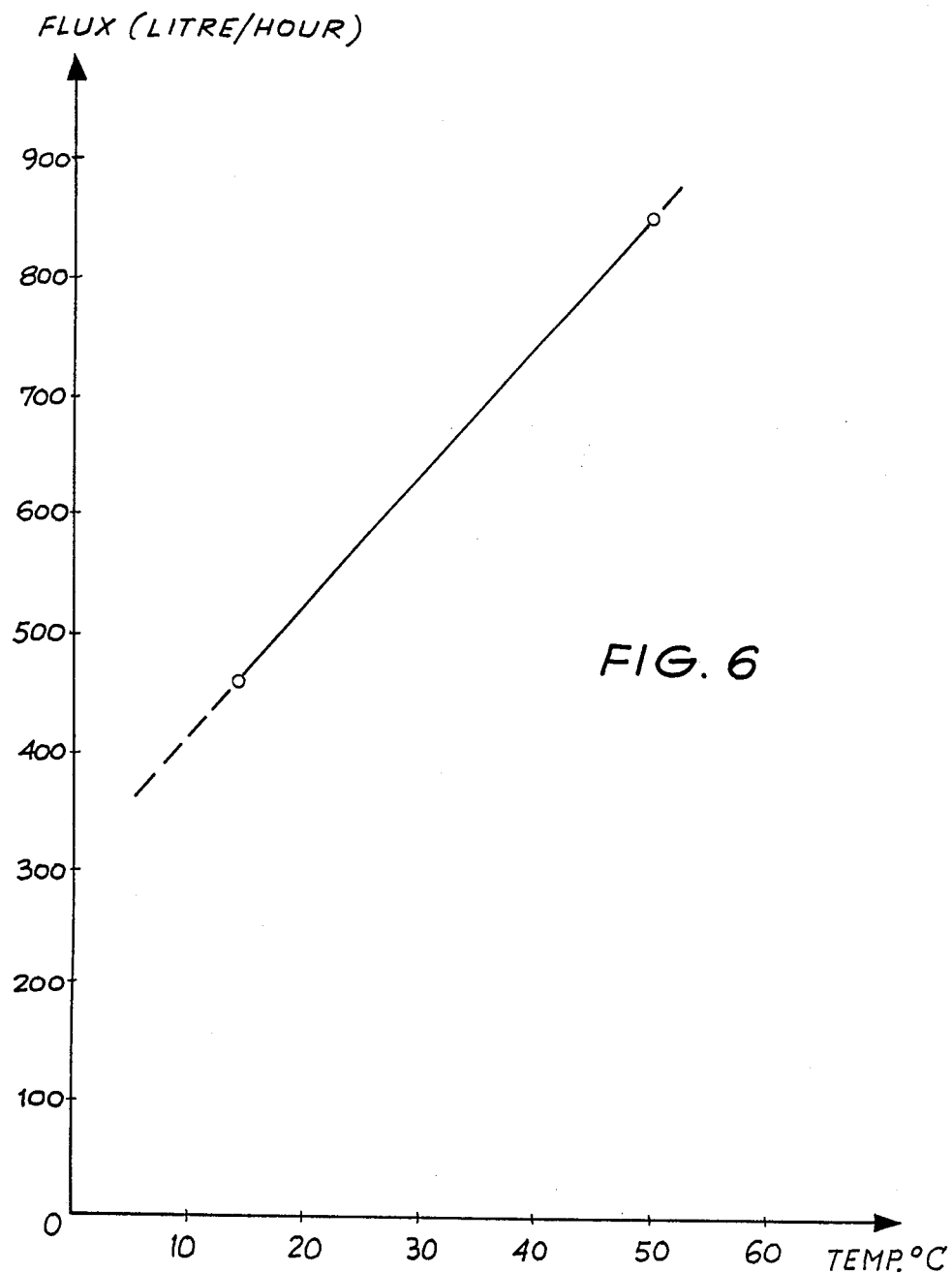
FIG. 6 is a graph of water flux against temperature for the liquid suspension treating system of FIG. 5 showing the dependence of water flux on temperature, and, FIG. 7 is a graph of clarified liquid flux against time for the liquid suspension treating system of FIG. 5 with the feed at an elevated temperature.

The results of this example are graphed in FIG. 6 which clearly shows the dependence of water flux on temperature.

EXAMPLE 4

Figure 7:
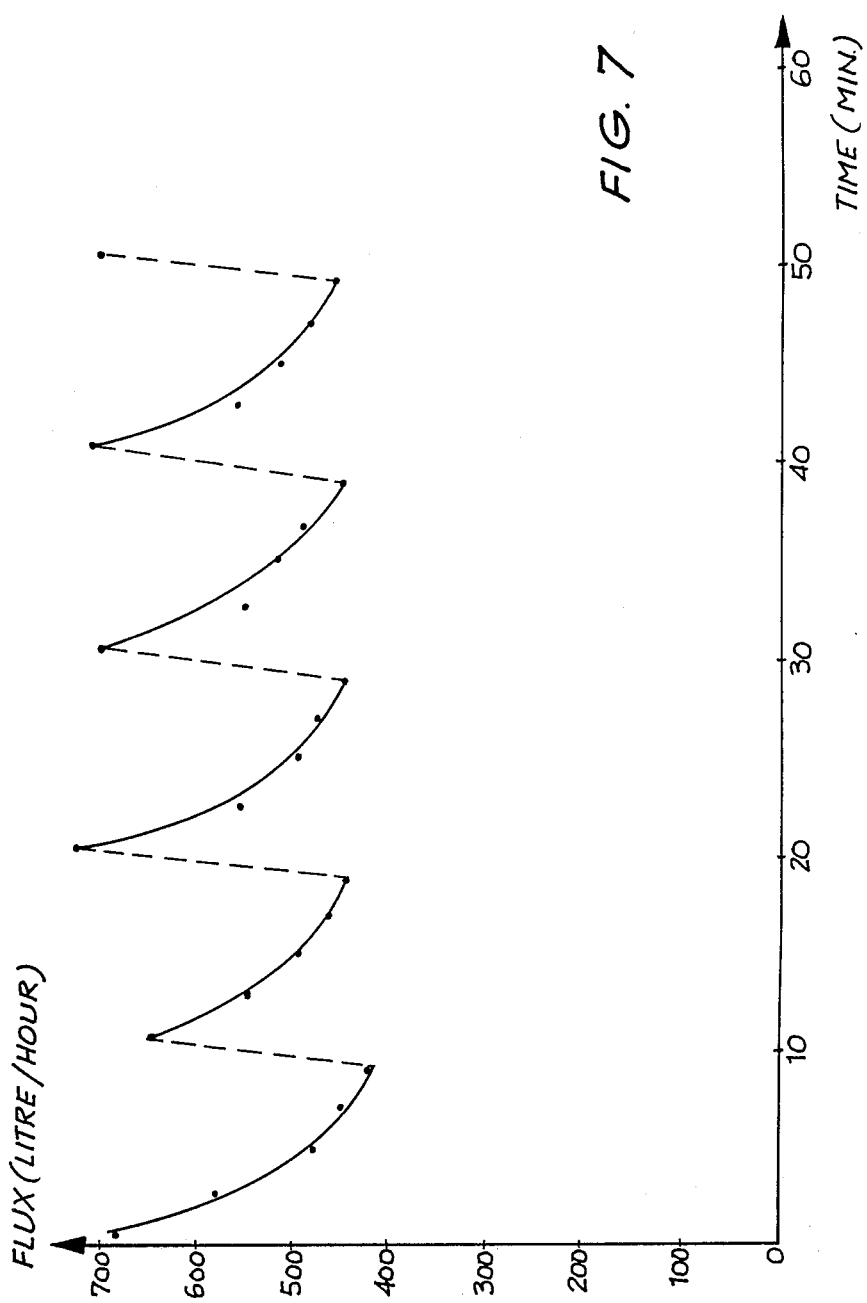

The apparatus of FIG. 5 was used to filter a 2.5 gram/litre bentonite suspension at the somewhat elevated temperature of 42 degrees Celsius at a transmembrane pressure of 150 kPa and the results graphed in FIG. 7. The combined action of higher temperature (high considering the low heat distortion temperature of the fibre used) and the apparatus and operating procedures of the invention allow continued high output with total clarity of output even with the notoriously difficult bentonite feed suspension.

We claim:

1. A method of treating a heated liquid suspension which comprises:
   (a) applying a heated liquid suspension to elastic, microporous, hollow fibres having a pore size of about 0.01 to 10 $\mu$m within a shell or housing,
   (b) discharging solids retained on or in the fibres by applying to the fibre lumins a pressurized reverse flow of gas and rapidly cooling the hollow fibres prior to applying the pressurized reverse flow of gas sufficient to enable reverse flow of cleaning gas through the fibres.

2. A method of concentrating solids in a liquid suspension using a filter comprising a plurality of hollow, each fibre having an outer surface, an inner surface defining a lumen, and a porous wall therebetween, comprising the steps of:
   (i) applying the liquid suspension to the outer surface of the elastic, microporous, hollow fibres having a pore size of about 0.01 to 10 $\mu$m; sufficient that:
      (a) a portion of the liquid suspension passes through the walls of the fibres, thereby being drawn off as clarified liquid from the fibre lumens,
      (b) at least a portion of the solids of said suspension are retained on or in the fibres or otherewise within the shell while the remaining solids not being retained are removed from the shell with the remaining portion of the liquid suspension,
   (ii) terminating the flow of liquid suspension, rapidly cooling the hollow fibres and then applying to the fibre lumens a gas at a pressure sufficient to stretch substantially all of the pores followed by
      (a) maintaining the flow of the gas at said pressure through the lumens for a time sufficient to drive the liquid from the pores having a bubble point below the pressure of the gas so as to wash out any solids retained in those pores and to substantially dislodge solids retained in the outer surface of the fibres sufficient that the washed out and dislodged solids are removed from the shell to an external collection point, and then
   (b) reducing the pressure of the gas sufficient to enable reverse flow of cleaning gas through said fibres so that the pores will return to substantially their original size whereupon the gas is removed so that a portion of the liquid suspension passes through the walls of the fibres to be drawn off as a clarified liquid from the fibre lumens.

3. The method according to claim 1 or 2, wherein the application of the pressurized gas includes the steps of:
   (a) initially applying the gas at a pressure below the bubble point of the walls of the fibres so as to substantially displace liquid from the fibre lumens,
   (b) substantially sealing the shell and the external surfaces of the fibres with a liquid,
   (c) increasing the pressure of the gas above the bubble point of the walls of the fibres, and
   (d) releasing the liquid seal to allow the trapped gas to escape substantially uniformly through the fibre walls.

4. The method according to claim 1 or 2, wherein the fibres are cooled by passing gas down the lumens of the fibres.

5. The method according to claim 1 or 2, wherein the fibres are cooled by applying gas to the exterior surface of the fibres.

6. The method according to claim 1 or 2, wherein the steps of the method are carried out as a continuous process utilizing repetitive cycles of solids retention, fibre cooling and solids discharge.

7. A concentrator for concentrating fine solids of a liquid feed suspension, comprising:
   (i) a shell, having a liquid feed suspension inlet and outlet, and at least one clarified liquid discharge port;
   (ii) a plurality of elastic, hollow, microporous, polymer fibres having a pore size of about 0.01 to about 10 $\mu$m within a shell or housing;
   (iii) means for supplying pressurized feed suspension to the outside of the fibres, through the inlet;
   (iv) means for withdrawing clarified liquid from the fibre lumens, through the clarified liquid discharge port;
   (v) means for introducing a cooling medium to the fibres for rapidly cooling said fibres sufficient to enable reverse flow of cleaning gas through said fibres; and
   (vi) means for introducing a pressurized gas under pressure to the fibre lumens to effect a transmembrane cleaning of the fibres, the pressure of the gas being sufficient to stretch substantially all of the pores of the fibres and the flow of the gas being sufficient to ensure that the gas will pass through the larger pores of the fibres to substantially dislodge solids retained therein and to wash the outer surface of the fibres to substantially remove solids therefrom to an external collection point.

8. The concentrator according to claim 7, which further comprises means for sealing the feed suspension in the shell upon displacement of liquid from the fibre lumens by the pressurized gas so that the gas is trapped in the lumens at a pressure above the bubble point of the fibre walls, and means whereby the pressurized gas is released substantially uniformly through the fibre walls.

* * * * *